June 15, 1926.

J. J. REYNOLDS 1,588,908

COUPLING DEVICE

Filed May 18, 1925

Inventor
J. J. Reynolds

By
Attorney

Patented June 15, 1926.

1,588,908

UNITED STATES PATENT OFFICE.

JERRY J. REYNOLDS, OF OKMULGEE, OKLAHOMA.

COUPLING DEVICE.

Application filed May 18, 1925. Serial No. 31,159.

This invention relates to a device for securing elements to a shaft and more particularly for securing a fan pulley of an automobile cooling system to the outer end of a crank shaft.

Heretofore such pulleys have been secured to the shaft by means of pins which are in turn prevented from displacement by a cotter pin inserted through a perforation in one end of the securing pin. Due to the limited space in the fan pulley for the insertion of tools a great deal of difficulty is experienced in positioning and bending the ends of the locking cotter pins.

It is an object of the present invention to provide a pin for securing pulleys to shafts which may be conveniently and easily inserted and locked against displacement without necessitating the use of any tools other than the usual punch for driving the pin in position.

Another object of the invention is the provision of a pin and locking means therefor which may be automatically locked against displacement when driven into the usual alined passages in a shaft and pulley.

A further object of the invention is the provision of an automatic locking device for a pin which secures a pulley to a shaft, in the shape of a head having resilient fingers for gripping the end of the pin as the pin is driven into place through the usual passages provided in the pulley and shaft.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
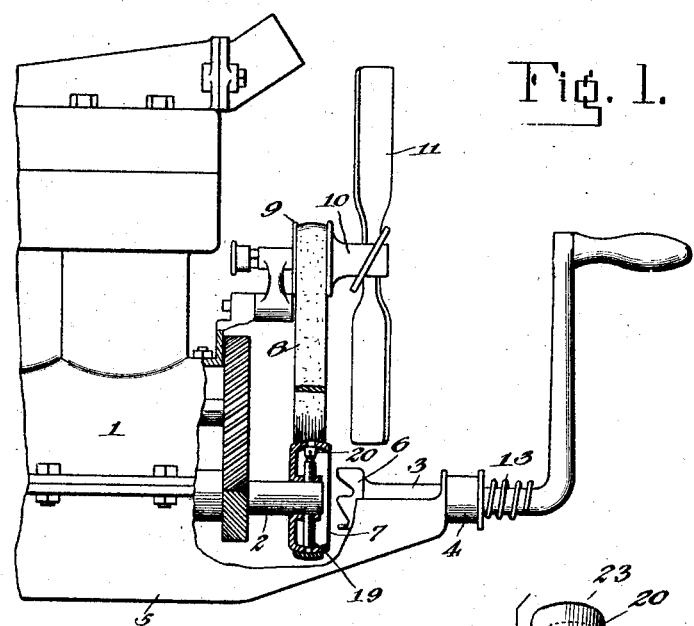
Figure 1 is a side view of an engine disclosing the general arrangement of certain elements forming the fan drive mechanism with my invention applied thereto.
Figure 2:
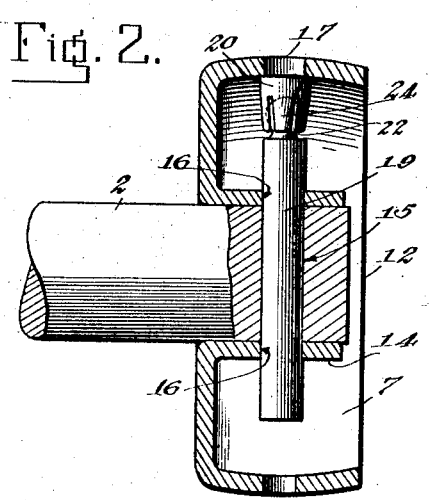
Figure 2 is a detail sectional view illustrating the means to secure the pulley on the shaft.
Figure 3:
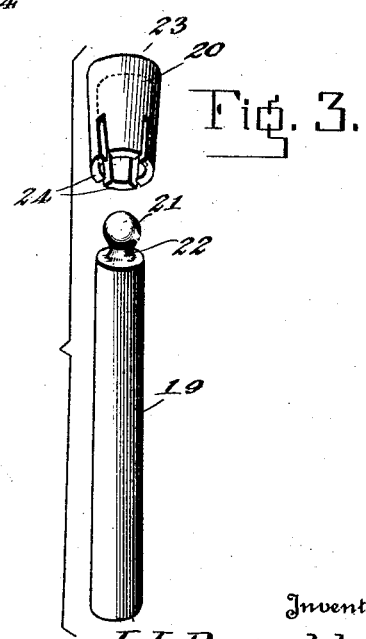
Figure 3 is a group perspective of the coupling member.

Referring more particularly to the drawings, 1 designates an automobile engine of the usual type having a drive shaft 2 and a crank 3 adapted to be manually operated and mounted for rotation in a bearing 4 on the forward end of the crank case 5 of the engine. The crank 3 has a dog 6 rigidly secured at its inner end for a purpose to be presently explained.

A fan pulley 7 is secured to the outer end of the crank shaft 2 and drives a belt 8 which, through a pulley 9 and a stub shaft 10 causes rotation of a fan 11.

The pulley 7 has an open end 12 facing the dog 6 and is adapted to be moved into said dog against the tension of a spring 13 when said crank is rotated. The pulley has a hub 14 through which is inserted the outer free end of the crank shaft 2. The inserted end of the shaft is provided with a passage 15 alining with perforations 16 in the hub and alining also with a perforation 17 in the rim 18 of the pulley. The perforation 17 is of such a diameter as to permit of the ready passage of a pin 19. A perforation 20 in the rim 18 having a smaller diameter than the pin 19 is diametrically alined with the perforations 15, 16 and 17.

In order to prevent the pin 19 from displacement from the pulley 7 and shaft 2, I provide a locking means in the form of a head 20 swivelled on a ball 21 at one end of the pin 19. A neck 22 of less diameter than the pin 19 connects the ball to said pin.

The head is frusto-conically shaped and inverted so that its base 23, which has a greater diameter than the perforation 17 to prevent escape of the head when once in place, will engage the inner wall of the rim across said perforation. The base may be curved to conform to the curvature of the inner wall of the rim. Resilient fingers 24 which are curved to conform not only to the spherical surface of the ball 21 in order to snugly grip the ball but to neatly engage with their free ends, the neck 22 between the ball and the pin, depend from the reduced end of the head or cone 20.

The pin 19 is driven through the perforation 17 and through the alined perforations 16 and 15 respectively located in the hub 14 and shaft 2 until the lower end 25 contacts with the inner wall of the rim 18 at the perforation 20. The locking cone or head 20 is then inserted through the open end 12 of the pulley 7 and placed in alinement with the ball 21 on the pin, with the base 23 covering the perforation 17. A punch or other suitable tool is inserted in the perforation 20 and driven inwardly until the ball has been forced into the socket formed by the circular arrangement of the fingers 24.

Since the fingers are resilient and the opening between the ends of the fingers is adequate, the fingers will be sprung apart during the admission of the ball and then spring back into place in snug engagement with the ball.

When it is desired to remove the pin, a punch is driven through the perforation 17 against the base 23 of the head 20 until the opposite end of the pin engages the inner wall of the rim 18 of said pulley at the perforation 20. Any suitable gripping tool may be applied to the head and pulled off. The pin 19 then may be driven through the perforation 17.

Thus it will be seen that the placement of the securing head on the pin 19 is automatic by the driving of the pin in the direction of the head when alined with the pin.

What I claim is:

1. A fan pulley pin for securing a pulley to a shaft and having a ball at one end and a neck of reduced diameter connecting the ball to the pin, and a removable head swivelled on the ball to prevent loss of the pin from the pulley.

2. A fan pulley pin for securing a pulley to a shaft and having a ball at one end, and a head provided with resilient fingers snugly gripping the ball.

3. A fan pulley pin for securing a pulley to a shaft and comprising a body having a ball-shaped head at one end thereof and a removable head having a socket and a plurality of separate incisions defining spring members adapted to grip said head of the body when the head is received in said socket.

4. A fan pulley pin for securing a pulley to a shaft and having a ball at one end, and a head provided with a socket, the walls of the socket being resilient whereby the ball on the pin may be forced past the walls and seat in said socket.

In testimony whereof I affix my signature.

JERRY J. REYNOLDS.